UNITED STATES PATENT OFFICE.

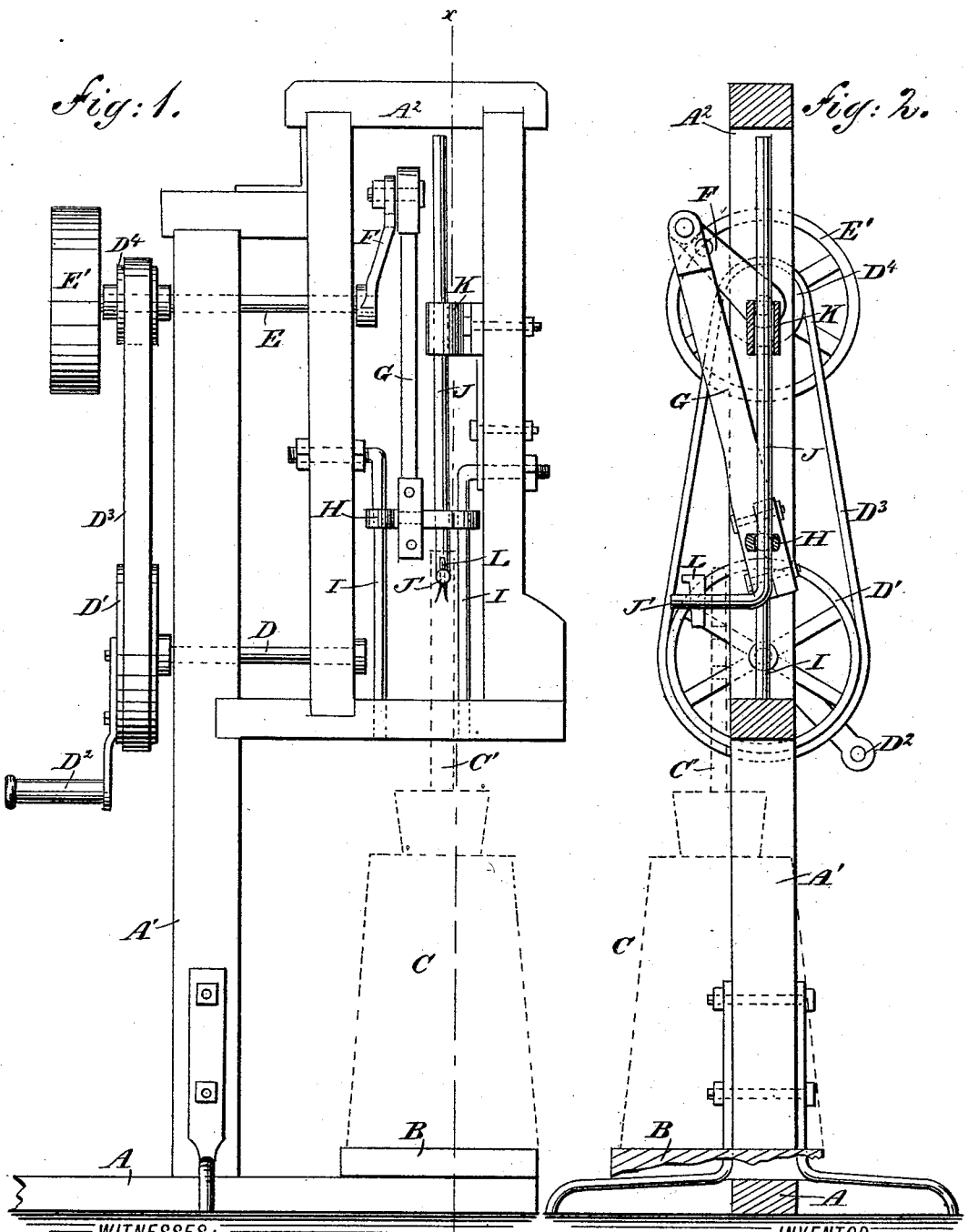

CHARLES D. OLDS, OF BARNARD, MISSOURI.

DRIVING MECHANISM FOR CHURNS.

SPECIFICATION forming part of Letters Patent No. 459,303, dated September 8, 1891.

Application filed April 29, 1891. Serial No. 390,929. (No model.)

*To all whom it may concern:*

Be it known that I, CHARLES D. OLDS, of Barnard, in the county of Nodaway and State of Missouri, have invented a new and Improved Driving Mechanism for Churns, of which the following is a full, clear, and exact description.

The object of the invention is to provide a new and improved driving mechanism specially designed for use on churns, and which is simple and durable in construction, very effective in operation, and requiring but little exertion on the part of the operator to set the device in motion to actuate the churn-dasher in order to churn the milk into butter.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in both the figures.

Figure 1 is a side elevation of the improvement, and Fig. 2 is a transverse section of the same on the line $x$ $x$ of Fig. 1.

The improved driving mechanism for churns is provided with a suitably-constructed base A, supporting a platform B, on which the ordinary churn C is placed. On the base A is erected a post A', supporting a frame A² of suitable construction. In the post A' and part of the frame A² is mounted to turn in suitable bearings the main driving-shaft D, carrying on its outer end a pulley D', on which is secured a crank-arm D² for conveniently turning the said pulley and shaft. Over the pulley D' passes a belt D³, also passing over a pulley D⁴, secured on a shaft E, also mounted to turn in suitable bearings in the post A' and part of the frame A² and located directly above the shaft D. On the outer end of the shaft E is secured a fly-wheel E', and on the inner end is fastened a crank-arm F, pivotally connected by a pitman G with a cross-head H, mounted to slide vertically on the rods I, secured in the frame A². In the cross-head H is held a rod J, extending upwardly and passing through a suitable bearing K, attached to the frame A². The lower end of the rod J is formed with an extension J', extending at right angles to the front of the machine and adapted to engage an opening in the upper end of the dasher C' of the ordinary churn. A key L is held by the extension J' to lock the dasher-rod C' in place on the said extension. When the churn-receptacle is in place on the platform B, the milk has been introduced in the same and the dasher-rod C' has been connected with the extension J'. Then the operator on turning the crank-arm D² causes a rotary motion of the shafts D and E, of which the latter imparts by the crank-arm F and the pitman G an up-and-down sliding motion to the cross-head H and a similar motion to the rod J, whereby the dasher-rod C' is moved up and down in the churn-receptacle and the milk is churned into butter. The crank F is provided with additional apertures for shifting the crank-pin to regulate the stroke of the dasher. It will be seen that by making the pulley D' considerably larger than the pulley D⁴ the operator needs to impart but a slow rotary motion to the shaft D, as the shaft E is revolved very quickly, and a consequent rapid up-and-down sliding motion is given to the cross-head H and consequently to the rod J of the dasher-rod C'. It will further be seen that the entire driving mechanism is very simple and durable in construction, and can be readily connected with the dasher of an ordinary churn.

Having thus fully described my invention, I claim as new and desire to secure by Letters Patent—

1. In a driving mechanism for churns, the combination, with a supporting-frame, a shaft mounted in the frame and provided with a crank-arm at one end, and means for operating said shaft, of guide-rods secured to the frame, a cross-head fitted to slide on the said rods, a pitman connected to the crank-arm and to the cross-head, a bearing on the frame, and a rod secured to the cross-head and sliding in the said bearing, said rod being provided with a right-angular extension, to which a churn-dasher is attached, substantially as described.

2. In a driving mechanism for churns, the combination, with a post supporting a frame, of a main driving-shaft journaled in the said post and frame, a pulley held on the said main driving-shaft and provided with a handle or crank mechanism, a second shaft mounted to turn in the said frame and post and carrying a fly-wheel, a small pulley secured on the second shaft and connected by a belt with the larger pulley on the main driving-shaft, a crank-arm secured on said second shaft, a pitman pivotally connected with the said second shaft, a cross-head connected with the said pitman, guide-rods held on the said frame and on which the said cross-head is mounted to slide, a rod engaging the said cross-head and fitted to slide in a bearing held on the said frame, and an extension formed on the said rod and adapted to engage the dasher-rod of the churn, substantially as shown and described.

CHARLES D. OLDS.

Witnesses:
C. W. DAVIS,
M. M. POWELL.